United States Patent [19]

Volka et al.

[11] 4,349,173

[45] Sep. 14, 1982

[54] TILT DEVICE FOR USE WITH CATHODE RAY TUBE DISPLAY UNITS

[75] Inventors: Lubomir J. Volka, Holbrook; Robert J. Wentzel, New Hyde Park, both of N.Y.

[73] Assignee: Burroughs Corporation, Detroit, Mich.

[21] Appl. No.: 162,419

[22] Filed: Jun. 24, 1980

[51] Int. Cl.³ ............................................. A47B 91/00
[52] U.S. Cl. .................................... 248/346; 248/183; 248/664
[58] Field of Search ............. 248/346, 349, 371, 397, 248/415, 418, 422, 425, 179, 181, 183, 133, 143, 139, 663, 678, 671, 664; D14/2

[56] References Cited

U.S. PATENT DOCUMENTS

| D. 253,594 | 12/1979 | Antenbring | D14/2 |
|---|---|---|---|
| 2,351,293 | 6/1944 | Saunders | 248/349 X |
| 2,520,563 | 8/1950 | Preston | 248/346 X |
| 2,796,226 | 6/1957 | Dalton et al. | 248/183 |
| 2,901,208 | 8/1959 | Jones | 248/346 |
| 3,817,393 | 6/1974 | Neilsen | 248/371 X |
| 3,970,792 | 7/1976 | Benham et al. | 248/183 X |

FOREIGN PATENT DOCUMENTS 16913  1/1980  European Pat. Off. ............ 248/349

*Primary Examiner*—J. Franklin Foss
*Attorney, Agent, or Firm*—Mark T. Starr; Kevin R. Peterson; Edward J. Feeney, Jr.

[57] ABSTRACT

An infinitely variable tilting support mechanism is disclosed for use with a cathode ray tube display unit which enables a particular operator to position the display unit for minimum reflective glare on the face thereof.

The display unit is pivotally tilted about its center of gravity in quasi-static equilibrium by a particular circular configuration of one or more rocker elements.

6 Claims, 5 Drawing Figures

TILT DEVICE FOR USE WITH CATHODE RAY TUBE DISPLAY UNITS

BACKGROUND OF THE INVENTION

A. Field of the Invention

The invention relates to mounting mechanisms for cathoe ray tube display units and more particularly to an infinitely adjustable tilting device for such display units which minimizes reflective glare on the face thereof.

B. Prior Art

In the office place of today, there is a growing concern for the comfort and productivity of the office worker. In particular, the design of office equipment intended for use by operators for extended periods must consider not only convenience of operation but minimize operator fatigue as well. It is for this reason that a growing demand for equipment features such as detached keyboards, acoustic shrouds and glare filters exists. These features have the sole purpose of combatting operator fatigue.

Designers of equipment utilizing cathode ray tubes as a display medium have been confronted with two problems which have been a continual annoyance to operators. First surface reflections from the glass face of the cathode ray tube, and operator line of sight to the face of the tube. The problem of reflections from the tube face can be dealt with by treating the glass face of the tube to diffuse the reflections or interposing a "glare" filter which is specially treated to reduce reflections between the tube and viewer. While greatly improving the situation, these solutions are not entirely effective under all ambient light conditions and can be costly.

A designer of "CRT" display equipment is also faced with choosing the optimum angle at which the display face is mounted for convenient, unstrained viewing. The best he can achieve with a fixed position display is based upon "standard sized" operators working from standardized furniture. Unfortunately, neither operators nor office furniture are all standard.

The solution to these problems and the one most frequently employed is to allow the display face or the entire display unit to tilt and possibly even to swivel. With such features, an operator can easily set the angle of the display to that which is most comfortable for viewing and eliminates any localized background reflections from the field of view. However, previous attempts to accomplish this have been limited in scope and complex in detail.

BRIEF DESCRIPTION OF THE INVENTION

A. Objects of the Invention

Accordingly, it is an object of the invention to provide a unique and simple device to accomplish the tilt function.

It is another object of the invention to provide a tilting device for a cathode ray tube display unit which is not only easy to install but which can be installed on equipment existing in the field with a minimum of effort.

It is a further object of the invention to provide a tilting device for a cathode ray tube display unit which is infinitely adjustable.

It is a still further object of this invention to provide a tilting device which has a minimum number of discrete non-moving parts.

It is another object of this invention to provide a tilting device which does not require the operation of supplementary locks or releases to accomplish and hold a change of tilt angle through friction and gravity alone.

B. Summary of the Invention

In the preferred embodiment of this invention, we have avoided the usual tilting device solutions which have been associated with cathode ray tube display units. The device essentially comprises two parts. The first part is a supporting base. Into this base is placed a rocker support portion which accomplishes the tilt function. The present tilting device does not utilize detent devices or other positive locking mechanisms, rather it possesses an infinite number of positions. In addition, any shifting that is necessary to move the display unit is accomplished merely by manual pressure on the unit itself. Further, once the unit is in the preferred position desired at that time, it need not be locked to enable it to stay there. And finally, the mechanism need not be initially built into the system, it may be given as an option for later installation into a previously purchased system.

BRIEF DESCRIPTION OF THE SEVERAL VIEWS OF THE DRAWING

The foregoing objects and the summary will be more readily understood when read in conjunction with the accompanying drawings in which.

DETAILED DESCRIPTION OF THE INVENTION

Figure 1:
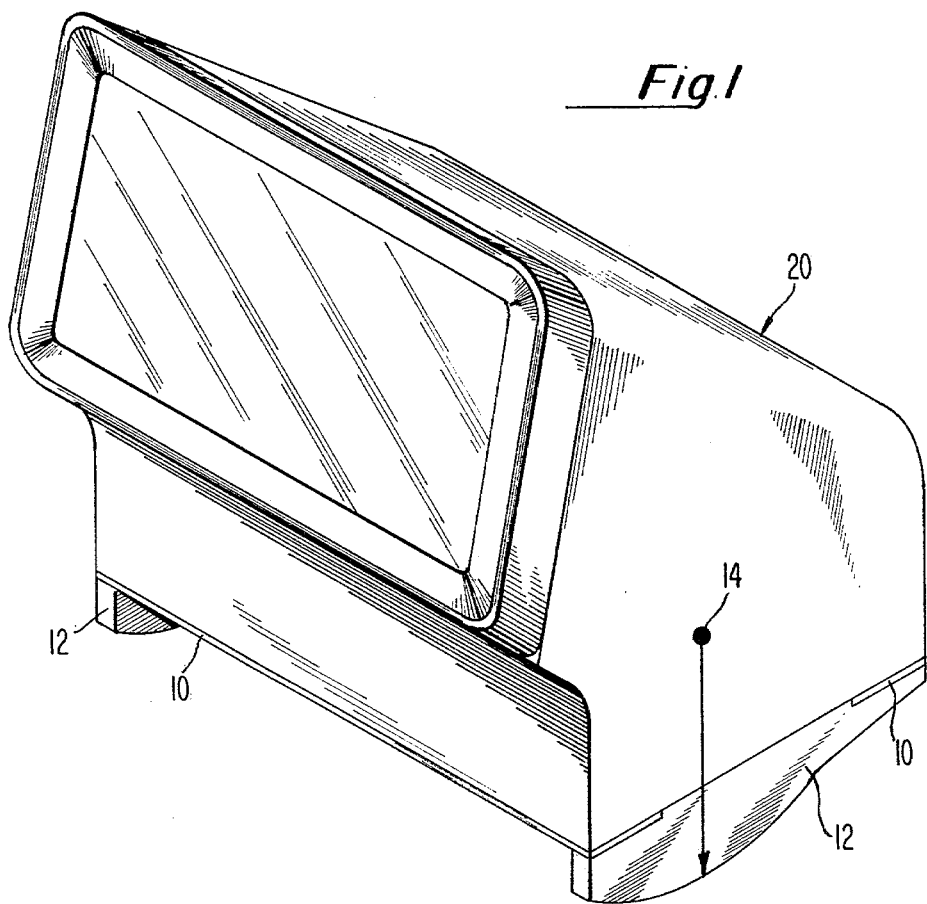
FIG. 1 illustrates a typical video display unit mounted upon a rocker platform.

The following detailed description will be more easily comprehended when it is read with reference to the foregoing drawings in which like reference characters symbolize corresponding parts.

FIG. 1 illustrates the positioning of a typical display unit 20 upon the supporting platform 10. The center of gravity indicated at 14 is the center of gravity of the particular display unit 20. From this point 14 the rocker 12 is circularly shaped by using the center of gravity as the center point of the circle. The radius of this circle is the distance from the center of gravity to the edge of the rocker 12. It is, of course, realized that although the center of gravity is indicated as a point 14, it is, in actuality, a line passing through the video display unit 20. Thus, on the side of the video display unit, not shown, a similar point 14 exists, from which the opposite rocker 12 is similarly created.

Figure 2:
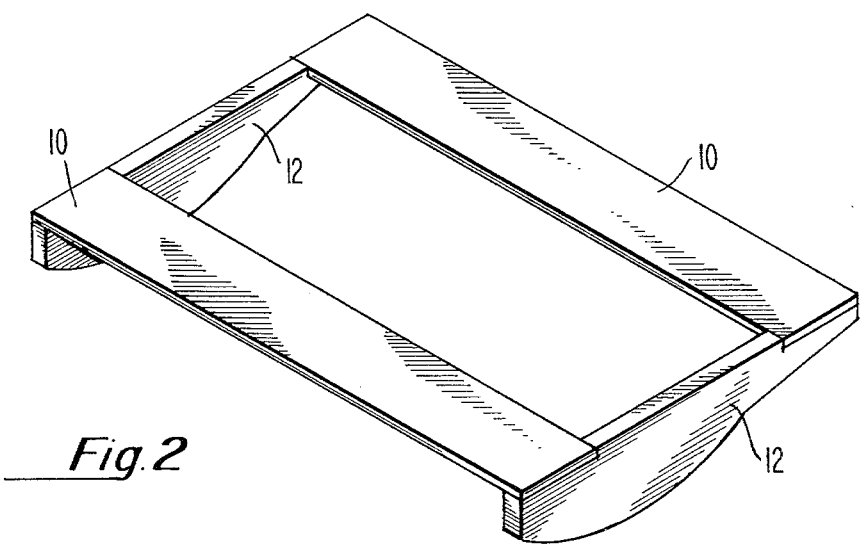
FIG. 2 is a perspective view of the supporting rocker platform.

FIG. 2 shows the rocker support assembly. It basically is comprised of a supporting platform 10 and one or more rockers 12. The rockers 12 may be two equally spaced elements as shown in FIG. 2 or it may include a plurality of elements spaced at intervals along the bottom of supporting platform 10. It even could be a single rocker of sufficient width for stability, centered on the bottom of the support platform 10.

Figure 3:
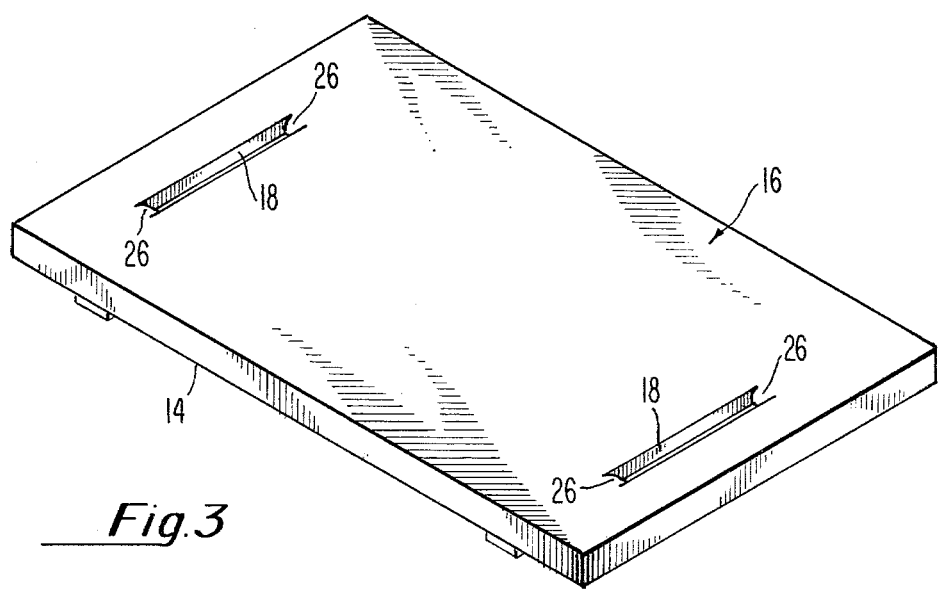
FIG. 3 is a perspective view of the support base.

FIG. 3 shows the support base 16 having recesses 18 in locations on the support base 16 which correspond to the rocker supports 12. These recesses 18 will be appropriately shaped so that the rocker 12 may be movably mounted therein. The support base 16 may have low friction feet (not shown) on the underneath portion 24 of the support base 16. Similarly, it may be rotatably mounted in a "lazy susan" fashion so that the display unit 20 may be rotated as well as tilted.

Figure 4:
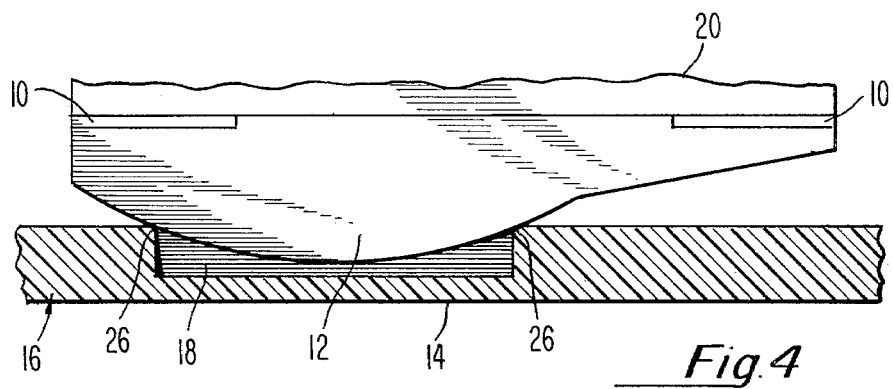
FIG. 4 is a more detailed illustration of the rocker platform mounted into the support base.

In FIG. 4, a detail drawing illustrates the contact points 26 of the recess portion 18 of this base 16. It is readily seen that the recesses may be configured such that contact may be made over a minimum area. In this way, the rocker 12 may slide in the recess 18 with minimum friction, since contact is only made at two points. This sliding motion, of course, is translated into the infinitely variable tilting positions of the video unit 20.

Figure 5:
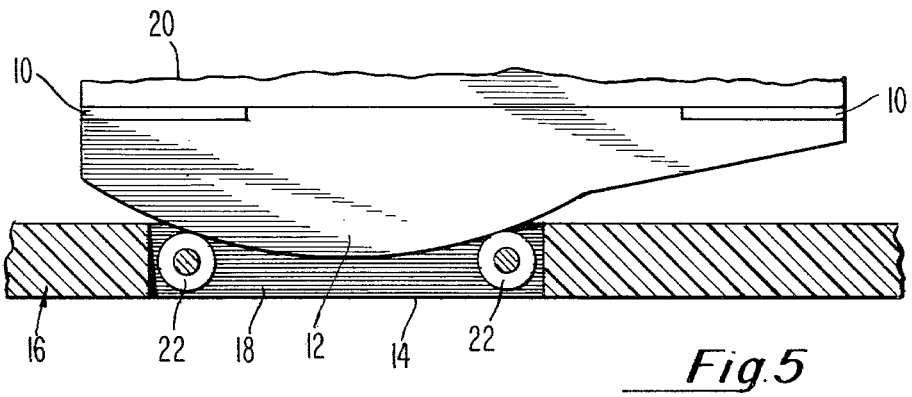
FIG. 5 is an alternate embodiment utilizing a pair of rotating bearings to support the rocker platform.

Finally, FIG. 5 illustrates an alternate configuration which may be utilized. In this configuration, the minimum contact points 26 of FIG. 4 are replaced by a pair of rotating bearings 22. It is believed readily understood that by replacing the sliding contacts 26 of FIG. 4 with the rotating bearings 22 of FIG. 5 that the tilting adjustments may be more easily and smoothly performed.

In conclusion, the device is essentially composed of two parts: A supporting base (lower portion) and a rocker support (upper portion), which accomplishes the tilt function. The rocker support, FIG. 2, is designed to support the weight of the display unit and its features are arranged to permit the display unit to rest on top of it and be secured to it. The two vertical support members shown are spaced to provide stable support to the mounted unit and can be reduced to a single support if sized appropriately or increased in number to three or more if required. The lower edge of this support member is contoured to provide a circular profile. The radius of this circular profile is chosen to provide sufficient rotation to accomplish the desired degree of tilt in each direction. The center of this profile, however, must be coincident with the location of the center of gravity of the display unit to be supported (FIG. 1). In this fashion, the display unit is pivoting about its center of gravity in a state of quasi-static equilibrium. The remaining shape of the support member is arranged so as to permit unrestricted rotation in the degree and direction required.

The support base (FIG. 3) is configured to rest upon a table or desk top. Its size is governed by the size and location of the rocker supports (FIG. 2). To its underside may be mounted a "lazy susan" type bearing or low friction button feet to allow easy swiveling on a desk or table top.

The rocker supports rest on the support base in corresponding recesses provided in the top surface of the support base which serve not only to support the rocker supports but contain them as well. The recesses are configured such that the circular profile of the rocker supports contact only each end of the recess thereby creating two contact points on which the rocker supports may slide with minimum friction (FIG. 4). It is this sliding motion along the circular profile that is translated to a tilt motion of the display unit. These recesses may be lined with rotating bearings to serve as the contact points if required (FIG. 5). The rocker support and support base may be separable or captivated together after initial assembly.

The advantages of a tilt device as described above are the following:

1. It can be accomplished with a minimum amount of discrete, non-moving parts.
2. It does not require the operation of supplementary locks or releases to accomplish and hold a change of tilt angle. Friction and gravity alone maintain any desired tilt angle.
3. It may be constructed as a device separate from the display unit and thereby be optional or the required features may be incorporated as integral parts of the display unit enclosure.
4. It is infinitely variable within its designed range since no form of positive detenting is required.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. An infinitely variable support mechanism for movably mounting a display unit comprising:
   supporting platform means mountble on the underside of said display unit;
   at least one rocker member connected along its top to the bottom of said platform means, said rocker member having first and second sides extending downward from the front and back ends of the top of said rocker member, respectively, the bottom of said rocker member starting at the bottom of the first side of said rocker member and continuing in a circular profile toward the second side of said rocker member, the center of said circular profile coincident with the location of the center of gravity of the supported display unit, said circular profile terminating at a point between a vertical line corresponding to the center of gravity of said display unit and the second side of said rocker member and thence continuing therefrom in a line to the bottom of the second side of said rocker member; and
   a supporting base having at least one recess therein, each of said recesses for movably receiving the circular profile of at least one of said rocker elements, whereby said display unit may pivotably tilt about its center of gravity in quasi-static equilibrium.

2. The infinitely variable tilting support mechanism of claim 1 wherein the first side of each of said rocker elements is vertically longer than the second side of that said rocker element.

3. The infinitely variable tilting support mechanism of claim 1 wherein the terminating end of said circular profile is vertically lower than the starting end of said circular profile with respect to the bottom of said display unit.

4. The infinitely variable tilting support mechanism of claim 1 wherein each of said recesses in said supporting base includes at least two contact points upon which the edge of the circular profile of at least one of said rocker elements may ride.

5. The infinitely variable tilting support mechanism of claim 1 wherein:
   the edge of the circular profile of each of said rocker elements is plane; and
   each of said recesses in said supporting base includes at least one rotating bearing upon which the edge of the circular profile of one of said rocker elements may ride.

6. The infinitely variable tilting support mechanism of claim 1 wherein the number of recesses is equal to the number of rocker elements, each of said recesses for accommodating one of said rocker elements.

* * * * *